(12) United States Patent
Geer, Jr. et al.

(10) Patent No.: US 6,192,131 B1
(45) Date of Patent: Feb. 20, 2001

(54) ENABLING BUSINESS TRANSACTIONS IN COMPUTER NETWORKS

(75) Inventors: Daniel E. Geer, Jr., Cambridge; Henry R. Tumblin, Malden, both of MA (US); Eliot M. Solomon, Brooklyn, NY (US)

(73) Assignee: Securities Industry Automation Corporation, Brooklyn, NY (US)

( * ) Notice: Under 35 U.S.C. 154(b), the term of this patent shall be extended for 0 days.

(21) Appl. No.: 08/749,509

(22) Filed: Nov. 15, 1996

(51) Int. Cl.$^7$ .......................................................... H04L 9/00

(52) U.S. Cl. .......................... 380/283; 380/247; 380/30; 380/44; 380/279; 713/168; 705/64; 705/71; 705/44

(58) Field of Search .................................. 380/21, 23, 25, 380/4, 24, 247, 259, 260, 278, 779, 283, 44, 30; 713/168, 169; 705/64, 65, 66, 67, 71, 75, 74, 44

(56) References Cited

U.S. PATENT DOCUMENTS

| | | |
|---|---|---|
| 5,138,712 | 8/1992 | Corbin . |
| 5,590,199 | 12/1996 | Krajewski, Jr. et al. . |
| 5,629,980 | 5/1997 | Stefik et al. . |
| 5,659,616 | 8/1997 | Sudia . |
| 5,712,914 | 1/1998 | Aucsmith et al. . |
| 5,748,738 * | 5/1998 | Bisbee et al. ........................... 380/25 |
| 5,790,677 * | 8/1998 | Fox et al. ................................. 380/24 |
| 5,794,207 * | 8/1998 | Walker et al. .......................... 705/23 |
| 5,822,737 | 10/1998 | Ogram . |
| 5,841,865 | 11/1998 | Sudia . |

FOREIGN PATENT DOCUMENTS

WO9631965  10/1996  (WO) .

OTHER PUBLICATIONS

Schneier, Applied Cryptography, 2nd edition, pp. 185–187, Oct. 1995.*
Authentication and Delegation with Smart–Cards, M. Abadi, Mr. Burrows, C. Kaufman, B. Lampson, Oct. 22, 1990.
Robustness Principles for Public Key Protocols, Ross Andersin and Roger Needham.
Decentralized Trust Management, Matt Blaze, Joan Feigenbaum and Jack Lacy, 1996 IEEE.
Achieving Electronic Privacy by David Chaum, Scientific American, Aug. 1992.
Compliance Defects in Public–Key Cryptography, Don Davis May 29, 1996.
Network Security via Private–Key Certificates, Don Davis and Ralph Swick, pp. 64–67.
On the Factorization of RSA–120.
Establishing Identity Without Certification Authorities, Carl M. Ellison, pp. 67–76.

(List continued on next page.)

Primary Examiner—Tod R. Swann
Assistant Examiner—Paul Callahan
(74) Attorney, Agent, or Firm—Baker Botts

(57) ABSTRACT

A system for creating a log of a conversation includes a convener computer and a plurality of conversation computers interconnected by a computer network. The system includes an arbiter computer and a plurality of conversation computers interconnected by a computer network. The arbiter computer creates a public key pair comprising a new public key and a new private key, and causes the new public key to be transmitted to the conversation computers. The conversation computers receive the public key and transmit messages during the conversation. The arbiter computer uses the new private key to encrypt messages transmitted by at least some of the conversation computers during a conversation among the conversation computers, and to store the encrypted messages in a message log. The conversation computers cause messages in the message log to be decrypted using the new public key.

13 Claims, 6 Drawing Sheets

OTHER PUBLICATIONS

Cryptographic Sealing for Information Secrecy and Authentication, David K. Gifford, Aprik 1982,/vol. 24, No. 4.

Payment Switches for Open Networks, David K. Gifford, Lawrence C. Stewart, Andrew C. Payne and G. Winfield Treese, First USENIX Workshop on Electronic Commerce—Jul. 11–12, 1995.

Authentication in Distributed Systems: Theory and Practice, Butler Lampson, Martin Abadi, Michael Burrows, and Edward Wobber.

Requirements for Network Payment: The NetCheque™ Perspective, B. Clifford Neuman, Gennady Medvinsky, pp. 32–37.

Northern Telecom (Nortel) Introduces Web–Based Security Software Product Entrust/WebCA Enables Web Session Security, Nov. 11, 1996, pp. 1–2.

The Future of Integer Factorization, Andrew M. Odlyzko, The Technical Newsletter of RSA Laboratories—Summer 1995, pp. 5–12.

OM–Transact: A Technical Overview, Oct. 1996, pp. 1–24.

Become a CA: Avoid the middleman by Eamonn Sullivan, pp. 1–2, Nov. 11, 1996.

CPS Section 5: Validation of Certificate Applications, Apr. 22, 1997.

SET Background, May 5, 1998.

* cited by examiner

TO FIG. 2B

ENABLING BUSINESS TRANSACTIONS IN COMPUTER NETWORKS

REFERENCE TO APPENDIX

A text Appendix A is being submitted with this application.

BACKGROUND OF THE INVENTION

The present invention relates in general to enabling business transactions in computer networks.

Certifying authorities are known that generate public key certificates, enciphered with the private key of the certifying authority, that serve as letters of introduction of a particular party to any other party that can recognize the certifying authority as an introducer. The certifying authority typically makes the party seeking the certificate of introduction to prove that it is who it says it is, and then the certifying authority accepts the public key of the party and returns it in the certificate of introduction encrypted in the private key of the certifying authority, thereby binding the name of the particular party to the public key of the party.

SUMMARY OF THE INVENTION

One aspect of the invention features a system for creating a log of a conversation, the system including an arbiter computer and a plurality of conversation computers interconnected by a computer network. The arbiter computer creates a public key pair comprising a new public key and a new private key, and causes the new public key to be transmitted to the conversation computers. The conversation computers receive the public key and transmit messages during the conversation. The arbiter computer uses the new private key to encrypt messages transmitted by at least some of the conversation computers during a conversation among the conversation computers, and to store the encrypted messages in a message log. The conversation computers cause messages in the message log to be decrypted using the new public key.

Because the arbiter computer creates a new public key pair and uses the private key to encrypt the messages stored in the message log, the arbiter computer can lock the message log by destroying the private key. Messages can be read from the message log by any party having the public key, but the contents of the message log cannot be altered.

Another aspect of the invention features a system for certifying an authorization of a doing-business-as entity to perform business-related transactions, the system including a convener computer and a plurality of conversation computers interconnected by a computer network. The convener computer receives a plurality of authorization certificates certifying authority of users of corresponding ones of the conversation computers to perform business-related transactions referred to in the authorization certificate. The convener computer creates a public key pair that includes a new public key and a new private key, and creates an introduction certificate that certifies that a holder of the introduction certificate is a doing-business-as entity authorized to perform business-related transactions referred to in the introduction certificate that are derived from the business-related transactions referred to in the authorization certificates received by the convener computer. The introduction certificate includes the new public key. The convener computer causes the introduction certificate and the new private key to be transmitted to the conversation computers. Each of the conversation computers receives the introduction certificate and the new private key, and can decrypt messages using the new private key as evidence that the conversation computer has obtained the authorization certificate legitimately.

Numerous other features, objects, and advantages of the invention will become apparent from the following detailed description when read in connection with the accompanying drawings.

DETAILED DESCRIPTION

Figure 1:
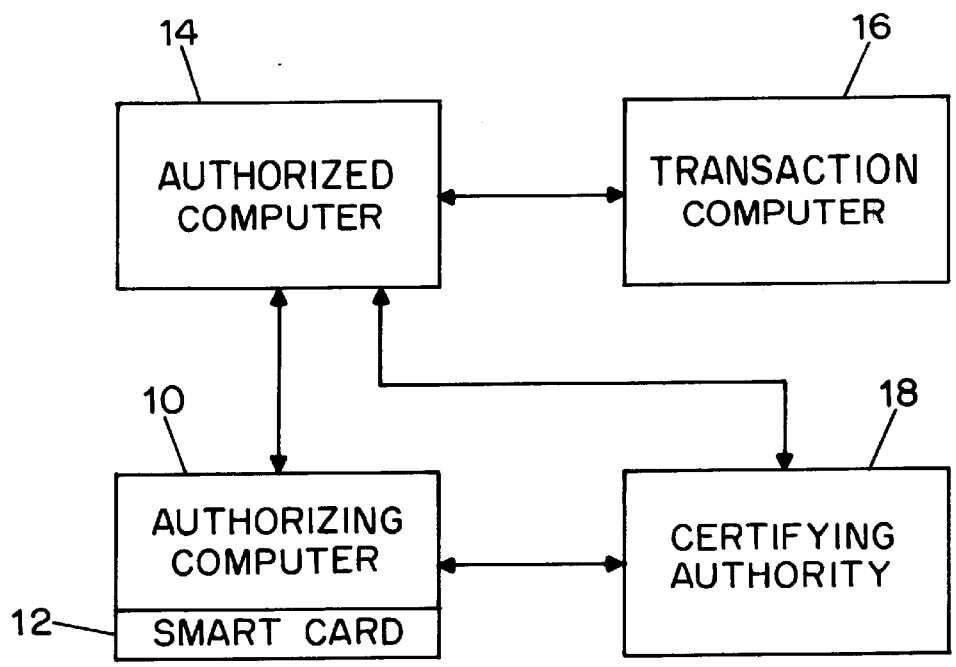
FIG. 1 is a diagram of a system for certifying authorizations.

With reference to FIG. 1, a system for implementing a transaction in accordance with the present invention includes an authorizing computer 10, a smart card 12 at authorizing computer 10 that corresponds to a specific user of the authorizing computer 10, an authorized computer 14 that is authorized by authorizing computer 10 to perform some specific action, and a transaction computer 16 that performs a transaction with authorized computer 14 that includes the authorized computer 14 performing the authorized action. The system also includes a certifying authority 18 that performs the conventional function of certifying the identity of the user to authorized computer 14 and transaction computer 16.

The smart card 12 at authorizing computer 10 is initialized once by the creation of a public key pair for the smart card (a private key that never leaves the smart card and a public key that can be distributed to others) and a public key pair for the user of the card (a private key that the user keeps confidential and a public key that can be distributed to others). The public key pair for the user of the card can be created by the manufacturer of the smart card (this guarantees uniqueness of the public key pair, provided that the manufacturer of the smart card can be trusted) or can be downloaded to the smart card from another source.

Figure 2A:
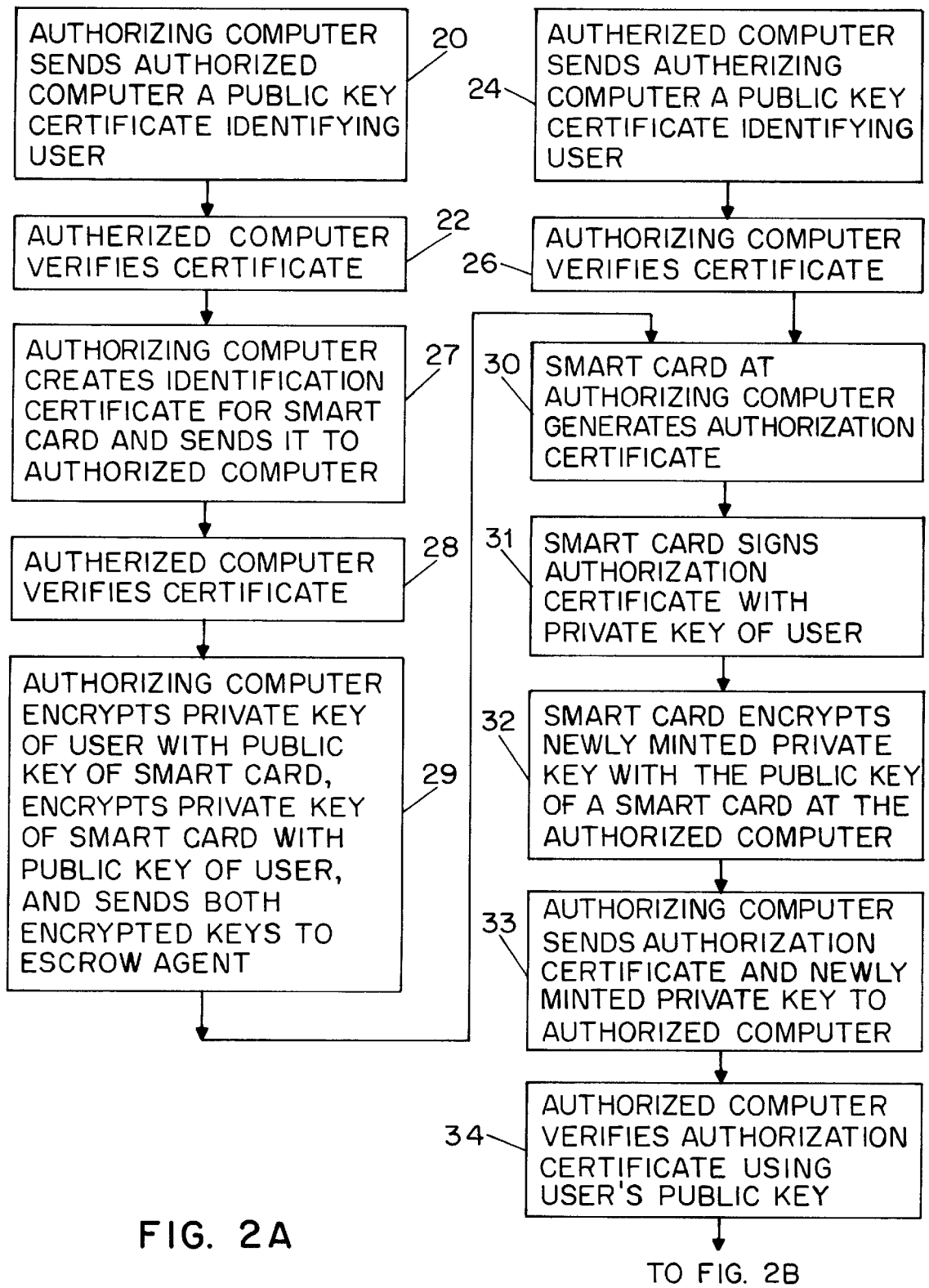
FIGS. 2A and 2B are a flow chart illustrating the operation of the system of FIG. 1.
Figure 2B:
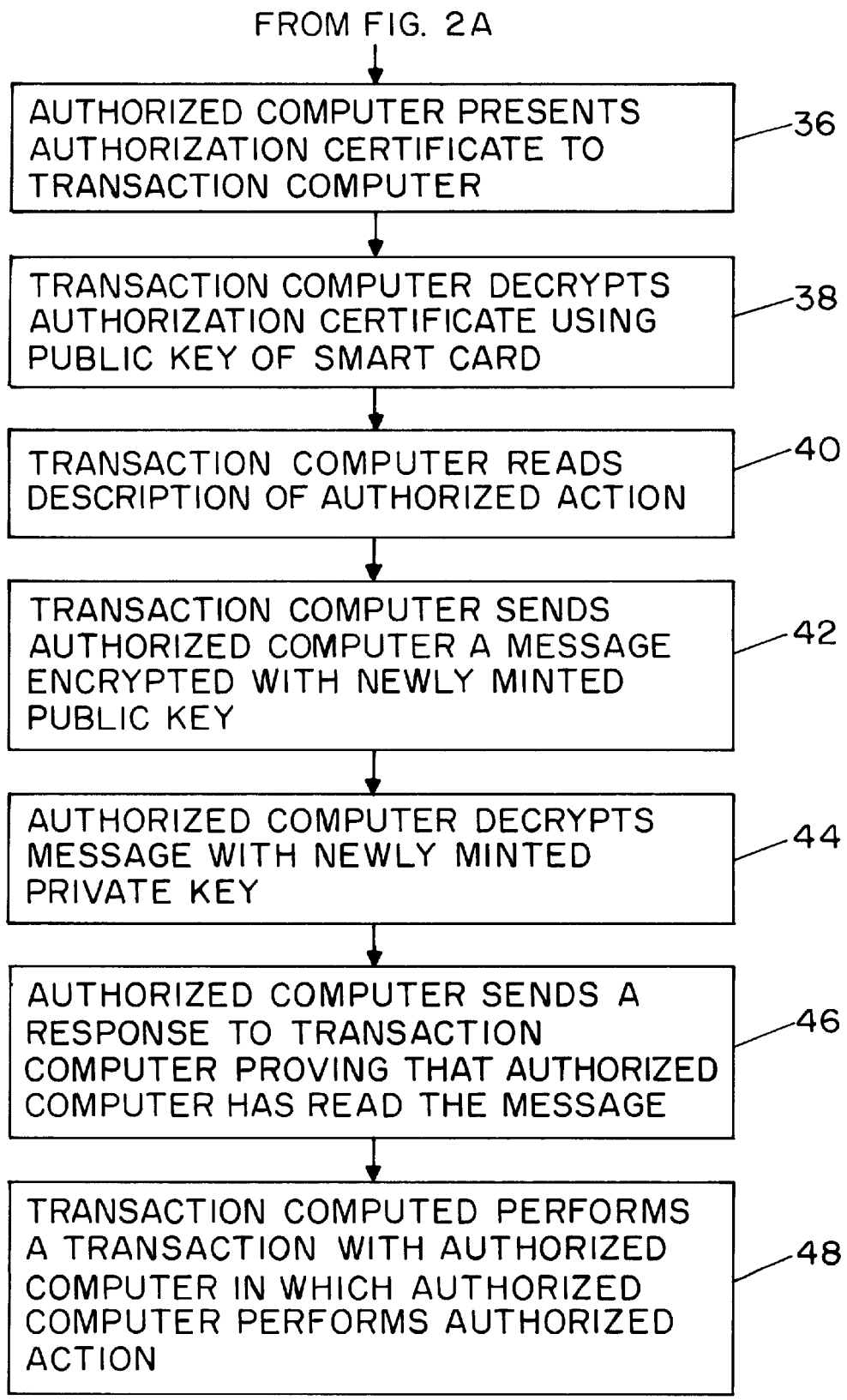

With reference to FIGS. 2A and 2B, in a general implementation of the present invention, the authorizing computer sends the authorized computer a public key certificate identifying the user and the user's public key to (step 20), as is conventional. The identification certificate is signed with the private key of the certifying authority, and the authorized computer verifies the authenticity of the signature on the identification certificate using the public key of the certifying authority, which certifying authority is known and trusted by the authorized computer (step 22). Similarly, the authorized computer sends a public key certificate to the authorizing computer identifying the user of the authorized computer and the user's public key (step 24), and the authorizing computer verifies the authenticity of the signature on the identification certificate using the public key of the certifying authority (step 26) (this may or may not be the same certifying authority that issued the identification certificate for the user of the authorizing computer). Again, this is as in conventional practice.

The authorizing computer also creates an identification certificate for the smart card at the authorizing computer and sends it to the authorized computer signed with the private key of the user of the smart card (step 27), and the authorized computer verifies the authenticity of the signature on the identification certificate (step 28) using the public key of the user of the smart card at the authorizing computer, which was received by the authorized computer in step 20.

The private key of the identification certificate for the user of the smart card will be used for encryption (sealing) purposes and the private key of the identification certificate for the smart card itself will be used for signing purposes. In alternative embodiments it is possible to switch the roles of these private keys, however.

The authorizing computer encrypts the private key of the user of the smart card with the public key of the smart card, and encrypts the private key of the smart card with the public key of the user of the smart card, and sends both encrypted private keys to an escrow agent (step 29). This ensures that if one private key is lost, the other private key can be retrieved from the escrow agent.

The smart card in the authorizing computer then generates an authorization certificate that certifies that the authorized computer is authorized to take some action specified in the authorization certificate (step 30). The authorization certificate contains a description of the authorized action and a public key of a newly minted public key pair corresponding to the authorized action. In essence, the authorization certificate represents a synthetic public identity that corresponds to the authorized action, and smart card 28 functions as a miniature certifying authority that both creates and certifies the synthetic public identity. The smart card 28 signs the authorization certificate with the private key of the smart card 28 (step 31) and encrypts the newly minted private key with the public key of a smart card at the authorized computer (step 32). The authorizing computer then sends the authorization certificate and the newly minted private key to the authorized computer (step 33). The authorized computer verifies the signature on the authorization certificate using the public key of the user of the smart card (step 34), which proves to the authorized computer that the authorization certificate was generated by the smart card, and the authorized computer then presents the authorization certificate to the transaction computer (step 36) as proof that the authorized computer is authorized to perform the action specified in the authorization certificate. The transaction computer decrypts the authorization certificate using the public key of the smart card at the authorizing computer (step 38), which proves to the transaction computer that the authorization certificate was generated by the smart card, and then the transaction computer reads the description of the authorized action (step 40). If the transaction computer requires verification of the authorization of the authorized computer to perform the action, then the transaction computer sends the authorized computer a message encrypted with the newly minted public key (step 42), and the authorized computer decrypts the message using the newly minted private key (step 44) and sends a response to the transaction computer proving that the authorized computer has read the message (step 46). The transaction computer then performs a transaction with the authorized computer in which the authorized computer performs the authorized action (step 48). This transaction can occur while the authorizing computer is off-line.

In one specific example of the method of FIGS. 2A and 2B, the authorized computer is operated by an electronic merchant and the authorizing computer is operated by a customer. The customer provides an identification certificate to the electronic merchant, who verifies it with the certifying authority that issued the certificate, as described above. This authenticates the customer to the electronic merchant. Similarly, the electronic merchant provides an identification certificate to the customer, who verifies it with the certifying authority. This authenticates the electronic merchant to the customer. The customer then provides to the electronic merchant an authorization certificate, signed by the smart card at the customer's computer, containing a purchase order, an authorization to debit the customer's account at a financial institution, and a newly minted public key, and the customer also provides to the electronic merchant the newly minted private key of the public key pair. The newly minted private key may be escrowed outside of the system herein described. The electronic merchant presents the authorization certificate to the financial institution, which verifies the signature on the authorization certificate using the customer's public key and uses the newly minted public key contained in the authorization certificate to encrypt a message to the electronic merchant, which uses the newly minted private key to open the message and send a response to the financial institution proving that the electronic merchant has read the message sent by the financial institution.

The financial institution then debits the customer's account and notifies the electronic merchant that the account has been debited. One advantage of this procedure is that the entire transaction between the financial institution and the electronic merchant can occur while the customer is off-line.

Background information on computer networks for electronic sales and payment transactions can be found in U.S. patent application Ser. No. 08/168,519, filed Dec. 16, 1993 and U.S. patent application Ser. No. 08/328,133, filed Oct. 24, 1994, the entire disclosures of which are hereby incorporated herein by reference.

If the item purchased by the customer is delivered electronically to the customer by the electronic merchant, the electronic merchant may package the purchased item with the authorization certificate created by the customer. The customer can then check the certificate without consulting an on-line certifying authority, because the certifying authority is the customer itself.

Alternatively, the customer may furnish two different authorization certificates to the electronic merchant: one for the reflexive information delivery back to the customer and one for the electronic merchant to use when invoicing the customer through the financial institution.

The item purchased by the customer may be software leased by the customer. The customer may rely on the authorization certificate returned by the electronic merchant to ensure that it is the electronic merchant of choice that is transmitting the software. The electronic merchant may tailor the software so that it can run only on a platform in which the newly minted private key of the authorization certificate is provably present, in order to prevent the software from being duplicated and used by others (at least insofar as it is in the customer's self-interest to prevent replication of the private key and thereby to prevent replication of the authority represented by the private key).

Each authorization certificate in accordance with the present invention specifies membership in a "club" that confers certain rights. Smart card owners would have the ability to confer membership privileges to other smart card owners, who would accumulate these membership privileges as authorization certificates stored in their smart cards.

Because the authorization certificate carries a permission or authorization to perform a particular action rather than just an authentication of a person's identity, the authorization relationships are inverted with respect to the conventional practice in connection with conventional public key identification certificates. In particular, with conventional identification certificates the recipient of the certificate, after satisfying itself of the certificate's validity, authorizes the performance of a certain action, but with the authorization certificates of the present invention it is the authorizing computer that transmits the certificate that authorizes the performance of a certain action.

Although we focus herein primarily on the use of smart cards to generate authorization certificates, such certificates can be generated by other types of smart tokens. As used herein, the term "smart token" refers to a cryptographic token that communicates with a computer and contains a private key half of a private key pair corresponding to the user of the smart token. Examples of smart tokens include credit-card sized cards having an embedded microprocessor that are insertable into a reader on the authorizing computer, and other smart tokens such as PC/MCIA cards.

The certificate minted by the smart card at the authorizing computer is a file structure having a set of "criticals" and a set of "extensions." The "criticals" include a distinguished name (conventionally, the user's name, but more generally simply a unique name), the name of the issuer of the certificate (the user's smart card), the cryptographic algorithm used to generate the newly minted public key pair, the key length, the signature algorithm used to hash the data in the certificate to ensure that the data is not altered, the signature itself, the lifetime of the certificate (the period during which the authorized action remains authorized), the newly minted public key, the serial number of the certificate, and all the serial numbers in the "chain" of certificates (beginning with a top-level certificate issued by a top-level certifying authority that certifies the identity and public key of a second-level certifying authority that issues a second-level certificate, etc.). The "extensions" include the description of the authorized action. A detailed discussion of the format of certificates is provided as Appendix A.

In certain embodiments some of the "extensions" that are unique to the authorization transactions described herein may be arbitrarily marked as "critical" so that any computer that receives the certificate will refuse to process the certificate if it is not programmed to process the extensions that are marked "critical" in accordance with the techniques of the present invention. This scheme of arbitrarily marking certain extensions, such as the name of a product being purchased or the lifetime of the product being purchased, as "critical" helps to ensure that the authorization certificate will not be useful to people who manage to copy it.

Public key certificates are revoked when they appear on a "certificate revocation list" issued by the certifying authority identifying the serial numbers of revoked certificates corresponding to compromised or stolen smart cards. When a computer receives a public key certificate it may check the certificate revocation list created by the certifying authority (or its designee) to determine whether the serial number of the public key certificate is on the certificate revocation list.

There is typically no need to maintain certificate revocation lists for the authorization certificates according to the present invention, however, because revocation can be accomplished simply by notifying the recipient of the authorization certificate or by waiting for the lifetime of the authorization as specified in the authorization certificate to expire. In other words, because the synthetic identity created by the smart card is an authorization rather than an actual identity of a user, the synthetic identity is so limited in scope that revocation can be made unnecessary.

Referring again to FIG. 1, certain embodiments of the invention do not require a transaction computer 16. Rather, authorizing computer 10 sends the authorization certificate to a smart card at authorized computer 14 that interacts with a program stored at the authorized computer. For example, authorized computer 14 might contain a program that requires a license or program fragment to function, the license or program fragment being contained in the extensions of the authorization certificate, which is stored in the smart card at authorized computer 14. The program may interact with the smart card in a manner analogous to the sequence of steps 42–46 in FIG. 2B to ensure that the smart card has obtained the conversation certificate and program fragment in a legitimate manner (program causes message to be sent to smart card encrypted with newly minted public key; smart card decrypts message with newly minted private key; smart card sends response proving that smart card has read the message). The authorization certificate containing the program fragment may be encrypted not only with the newly minted public key, but also with the public key of the smart card at the authorized computer, so that the buyer can receive the authorization certificate but can process the fragment only if that particular smart card is present.

Additional specific implementations of authorization certificates of the type described above are as follows:

While a consumer is at work, the consumer uses a smart card to buy a video from a Web page to be downloaded. The smart card issues an authorization certificate to the download server corresponding to the Web page. The server calls the consumer's-home-PC modem and presents the authorization certificate as a "May I download?" request. The consumer's home PC uses the public key of the consumer's smart card to validate the authorization certificate, and permits the download. When the consumer returns home, the video is ready to be watched.

A consumer uses a smart card to subscribe to an on-line magazine, but the magazine doesn't appear on a Web site (because the Web is slow) and it doesn't appear in the consumer's mailbox (because the magazine is too bulky for e-mail). Rather, the consumer sends an authorization certificate to the magazine publisher to send the magazine to the consumer's local disk, or on the consumer's home directory. The consumer's computer accepts the magazine's asynchronous download because the publisher presents the authorization certificate issued by the consumer's smart card when the consumer subscribed. The magazine spontaneously appears on the local disk or home directory, and the consumer receives a brief e-mail notice of each magazine's arrival. As has been described previously, the publisher may, at its discretion, have encrypted the magazine such that it may only be read when the customer's smart card is present.

A purchasing officer needs to buy something that requires a countersignature. The purchasing officer generates a new public key pair and sends an authorization certificate (to be sent eventually to a merchant) and the new private key (sealed) to a higher-ranking officer. The higher-ranking officer mints another authorization certificate containing the authorization certificate generated by the purchasing officer as well as authorizations granted by the higher-ranking officer. The authorizations granted by the higher-ranking officer include an authorization for the purchasing officer to buy the item requiring countersignature, and perhaps a limitation for the particular purpose at hand for which the item is being purchased. The authorization certificate created by the higher-ranking officer is sent to the purchasing officer along with the newly minted private key corresponding to the authorization certificate minted by the higher-ranking officer. This authorization certificate may be encrypted in the public key of the higher-ranking officer's smart card so that this authorization certificate is usable only after a session in which the higher-ranking officer's smart card has been used. The new private key is sealed in the junior officer's public key and may also be sealed in the public key of the junior officer's smart card in order to deny the junior officer the opportunity for further delegation. This scenario, in which the senior officer generates the new public key pair, is inherently consistent with escrow principles. The junior officer can use the authorization certificate generated by the senior officer in a transaction to which the junior officer would not otherwise be entitled to take part. The senior officer can inspect any and all communications made under cover of the delegated authority. This scheme can be extended to multiple counter-signatures including those which must be ordered in a particular way, because each successive authorization certificate includes a copy of the previous authorization certificate; i.e., the authorization certificates are recursive. In alternative embodiments, each successive authorization certificate includes only the serial number of the previous authorization certificate or includes only a description of the authorizations contained in the previous authorization certificate.

An executive wishes to delegate to a subordinate the right to process the executive's e-mail while the executive is on vacation. The executive issues an authorization certificate for processing the executive's mail, with limited time validity. Because the authorization certificate is a delegation certificate, any cryptographically signed mail sent by the subordinate will be signed with the newly minted private key "on behalf of" the executive. Recipients of such e-mail messages also receive the authorization certificate that establishes the subordinate's right to send e-mail on behalf of the executive.

An investor issues an authorization certificate to a broker combining a "limit order" and a "trade at close" directive, i.e., an order to trade at a range of prices if those prices obtain near a market's closing moment. Such an authorization certificate satisfies all the ordinary requirements of a secure communication: it is verifiably authentic, authoritative, non-repudiable, and can be structured to require it to be confirmed by the recipient at the moment of use (thereby enabling the authorization to be revoked if necessary). Members of a stock exchange can issue authorization certificates that enables investors to book trade orders directly through to the floor of the stock exchange, the authorization certificates containing volume or credit limits corresponding to the assumed risk of trade delegation to the investor.

A consumer writes an authorization certificate instead of a paper check. The authorization certificate authorizes the consumer's bank to debit the consumer's checking account upon presentation of the authorization certificate to the bank by a named or un-named identity. The consumer can send a "stop payment" order to the bank by sending a notice of certificate revocation to the bank signed with the consumer's private key.

A consumer uses a "personal-proxy web-server" such as Open Market's OM-Express™ to download a catalog, does off-line shopping, and places the order whenever it is convenient to do so by uploading a collection of "purchase" authorization certificates to the publisher of the catalog. The publisher presents the authorization certificates to the consumer's bank to debit the consumer's account at the bank.

Figure 3:
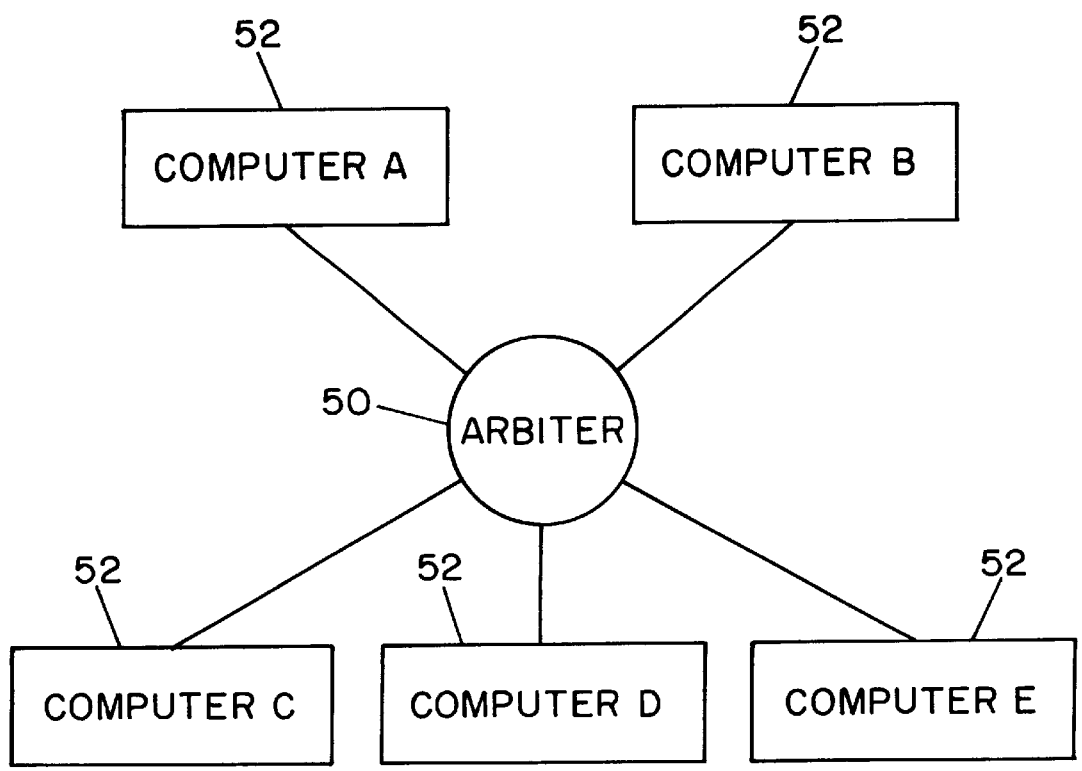
FIG. 3 is a diagram of a system for creating a log A of a conversation.
Figure 4:
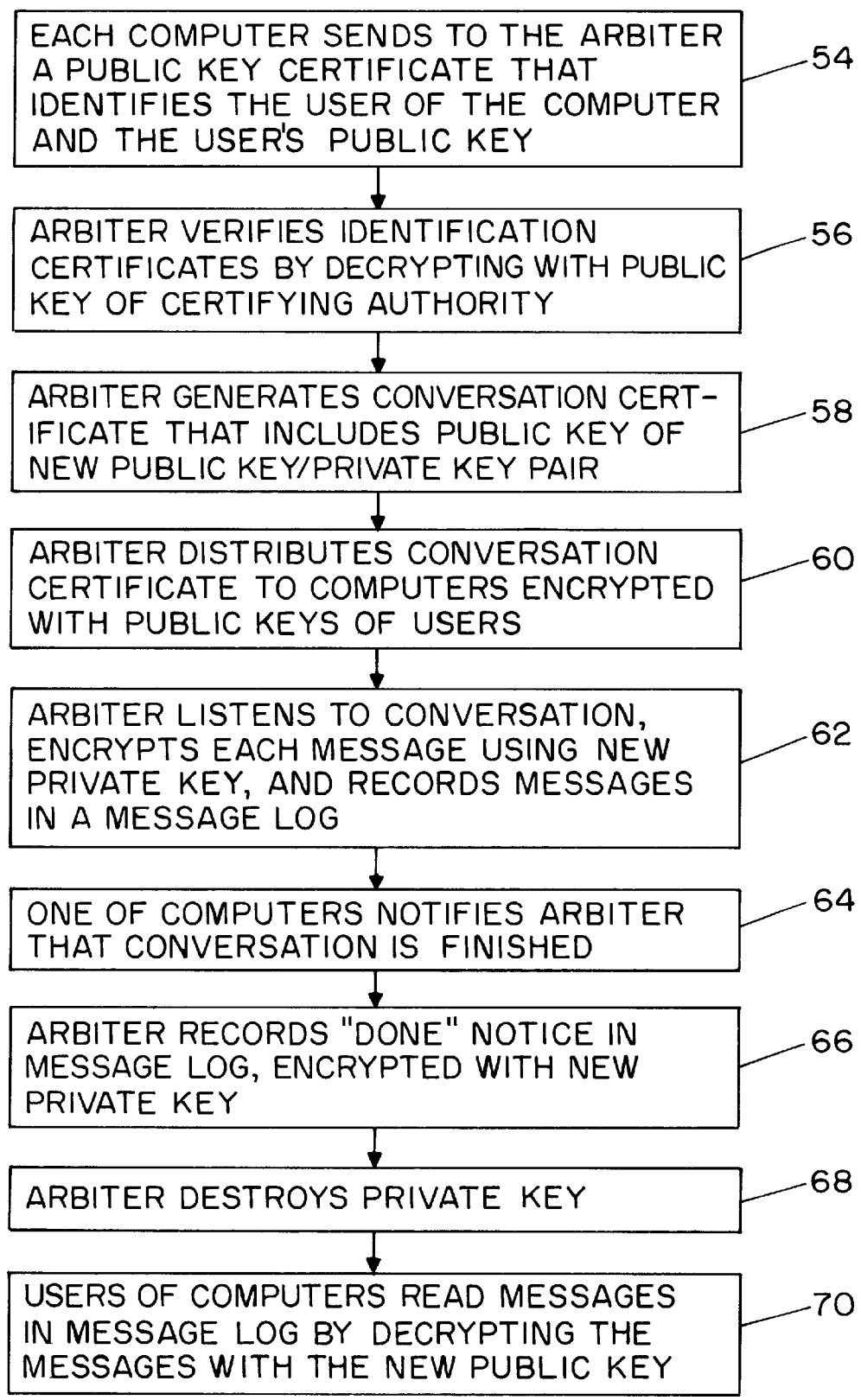
FIG. 4 is a flow chart illustrating the operation of the system of FIG. 3.

Referring to FIG. 3, one particular type of a authorization certificate is a conversation certificate that is created by an arbiter computer 50 of a conversation among a set of computers 52. As shown in the block diagram of FIG. 4, at the beginning of the conversation each computer participating in the conversation sends to the arbiter a public key certificate, issued by a certifying authority, that identifies the user of the computer and the user's public key (step 54). The arbiter verifies the authenticity of the identification certificate by decrypting it with the public key of the certifying authority, which certifying authority is known and trusted by the authorized computer (step 56).

The arbiter next generates a conversation certificate (step 58) that includes the public key of a newly minted public key pair and that also includes a pointer to a database containing a message log, and the arbiter distributes the conversation certificate to each of the computers in the conversation, encrypted with the respective public keys of each user of the computers in the conversation (step 60). The new private key is not distributed, however. The arbiter listens in to the conversation, encrypts each message transmitted from one computer to another using the newly minted private key, and records the messages in the message log (step 62). In fact, all messages may pass through the arbiter, i.e., each message is sent to the arbiter for encryption and recording and the party to whom the message is sent uses the new public key to decrypt the messages as they are recorded in the message log. At the end of the conversation, one of the computers notifies the arbiter that the conversation is finished (step 64), and the arbiter records a "done" notice in the message log, encrypted with the new private key (step 66). After a predetermined period of time has elapsed, the arbiter destroys the private key (step 68). This makes it impossible to alter the log entry; yet the users to whom the conversation certificate was distributed may read the message log by decrypting the messages using the new public key contained in the conversation certificate (step 70).

In the event that there are multiple conversations between multiple subsets of the computers monitored by the arbiter, the arbiter can create a set of conversation certificates corresponding to each of the respective conversations. For example, if initially there is a conversation between two of the computers and then three additional computers join in, the arbiter can initially create a conversation certificate for the two computers, which it distributes-to the two computers only, and then when the arbiter is notified that three additional computers will be joining, the arbiter creates a new conversation certificate and distributes it to all five computers. The arbiter records, as the final entry in the message log for the first conversation, a link to the message log for the second conversation, encrypted with the private key for the first conversation, which the arbiter then destroys. The arbiter records, as the first entry in the message log for the second conversation, a link to the message log for the first conversation, encrypted with the private key for the second conversation. The two parties to the first conversation can read the first message log by decrypting the messages using the public key contained in the first certificate, and all five parties can read the second message log by decrypting the messages using the public key contained in the second certificate.

Figure 5:
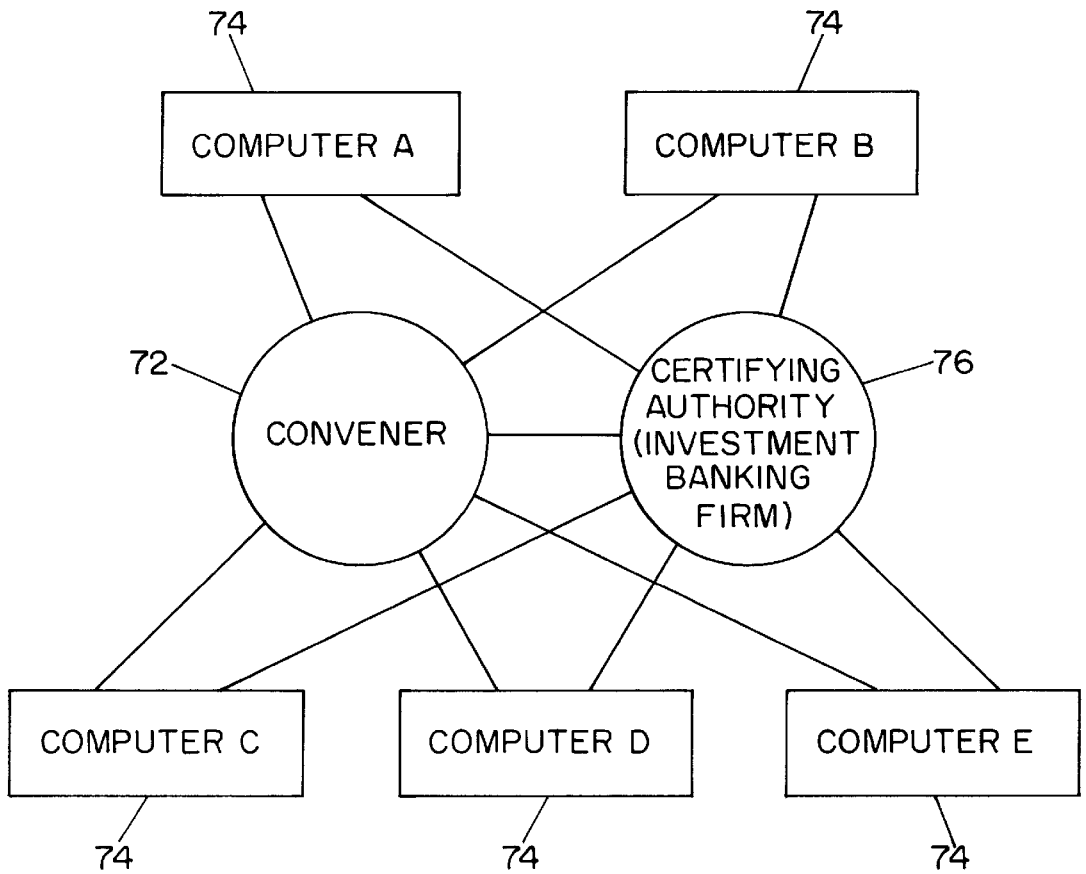
FIG. 5 is a diagram of a system for certifying an authorization of a doing-business-as entity to perform business-related transactions.

With reference to FIG. 5, one particular system that implements conversation certificates and other authorization certificates includes a convener computer 72 that convenes a business meeting and a set of computers 74 operated by parties to the business deal. The business meeting may pertain to an exchange of stocks or other instruments on a stock exchange, an exchange of commodities on a commodities, exchange, an auction, etc. In the case of an exchange of instruments on a stock exchange, convener 72 may be operated by the stock exchange itself. The system includes at least one certifying authority computer 76, operated by an investment banking firm, that certifies to convener 72 the authority a given party brings to the business deal (such as the shares controlled by the party, the right of the party to access certain files that might contain credit card numbers or privileged information such as personnel data or company secrets, and the right of the party to delegate authority).

The actual parties to the business deal may be the users of computers 74, and the business deal involves the creation of an ad hoc "doing business as" (DBA) entity corresponding to the-entire business group. In another model, there is one actual party (the group), and each computer 74 is operated by an agent of the actual party and corresponds to a distinct DBA entity. Other models involving other combinations of actual parties and DBA entities are possible.

Figure 6:
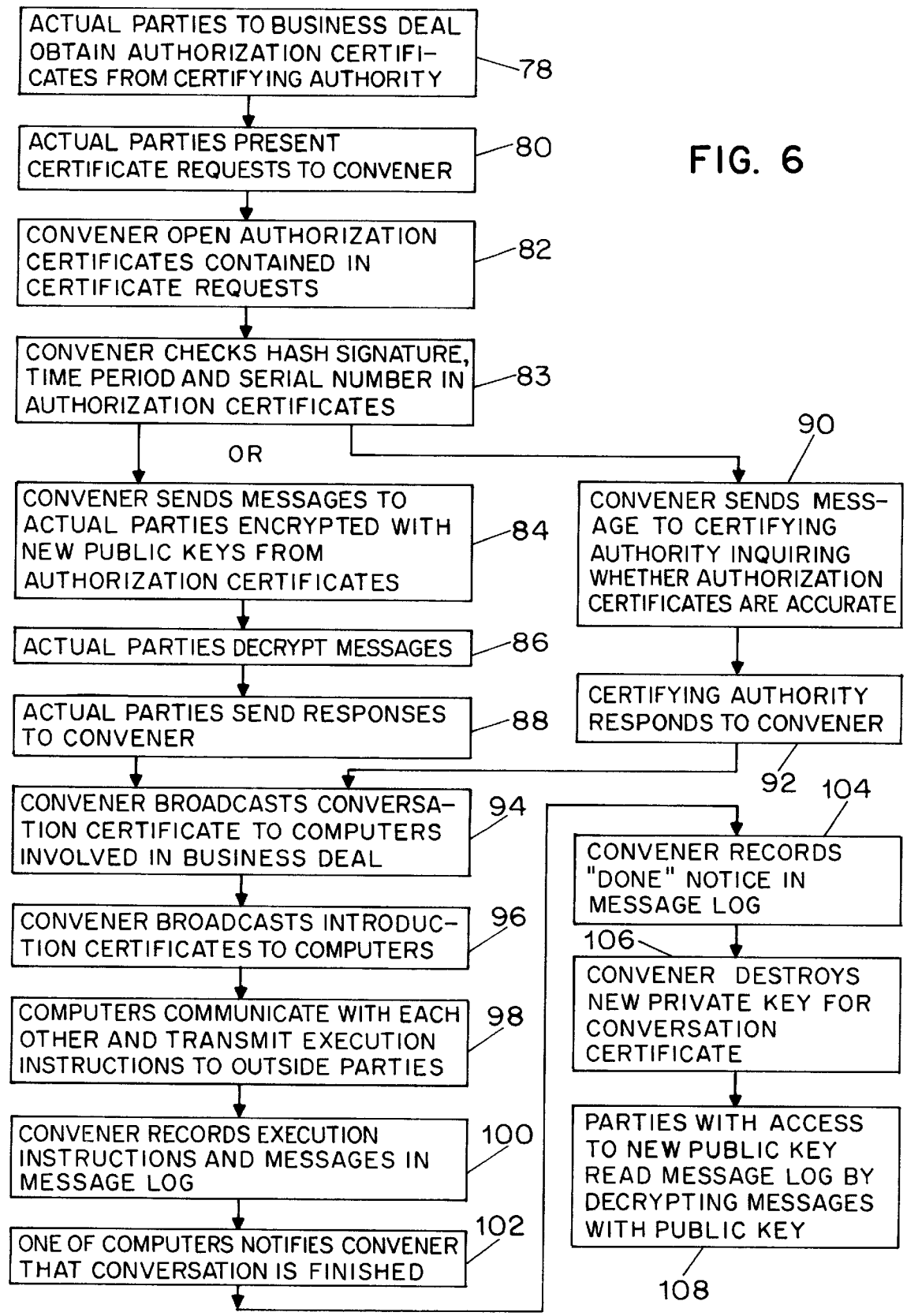
FIG. 6 is a flow chart illustrating the operation of the system of FIG. 5.

Referring to FIG. 6, in operation of the system of FIG. 5, each of the actual parties to the business deal obtains, from a certifying authority computer operated by an investment banking firm, an authorization certificate and a private key of a new public key pair minted by the certifying authority computer (step 78). The authorization certificate contains a description of the party's authority (shares controlled by the party, the right of the party to access certain files, and the right of the party to delegate authority to another party in the business deal, including DBA entities, or to an outside party). The authorization certificate also contains the public key of the new public key pair minted by the certifying authority computer as well as a hash signature, the time period during which the authorization remains valid, a serial number of the authorization certificate, etc. The authorization certificate is created by the certifying authority computer and used by the parties to the business deal in the manner described above in connection with FIGS. 1 and 2.

Each of the actual parties to the business deal presents to the convener a certificate request that asks the convener to issue one or more introduction certificates corresponding to one or more respective "doing business as" (DBA) entities (step 80). Each certificate request also includes the identities of the actual parties to the business deal, the authorization certificate of the actual party submitting the request, and a business model (described in detail below) that specifies how much information the convener should record in a message log during the business negotiations and who should be granted access to the recorded information. The certificate requests of the actual parties should all specify the same DBA entity or entities and the same actual parties.

The convener uses the public key of the certifying authority computer or computers to open the authorization certificates contained in the certificate requests (step 82), checks the hash signature in the authorization certificate to ensure against tampering, checks the time period in the authorization certificate to ensure that the authorization remains valid, and checks the serial number of the authorization certificate to ensure it has not been revoked (step 83). The convener uses the new public keys minted by the certifying authority computer or computers to encrypt messages to the actual parties to the business deal (step 84), which the actual parties decrypt using the new private keys minted by the certifying authority computer or computers (step 86). The actual parties then send responses to the convener proving that the parties have decrypted the messages sent by the convener (step 88). This proves to the convener that each of the actual parties has obtained its authorization certificate legitimately. Alternatively, the convener simply sends a message to the certifying authority computer inquiring whether the authorization certificate is accurate (step 90) and receives a response from the certifying authority computer (step 92).

The convener issues a conversation certificate and broadcasts it securely to each computer involved in the business deal (step 94). The conversation certificate is created and used in the manner described above in connection with FIGS. 3 and 4.

The convener then issues an introduction certificate for each DBA and sends that introduction certificate to each of the computers involved in the business deal, along with the private key of a new public key pair, encrypted in the private key of the conversation certificate (step 96). The introduction certificate identifies the DBA and its lifetime and describes the extent of the authority of the DBA (shares controlled by the DBA, the right of the DBA to access certain files, and the right of the DBA to delegate authority). The extent of the DBA's authority is based on the authority of the actual parties, including their authorization to delegate their authority to the DBA. The introduction certificate also includes the public key of the new public key pair. The parties to the business deal present the introduction certificate to outside parties whenever the parties, acting as or on behalf of the DBA entity, submit execution instructions to outside parties for trades of shares on the convener's stock exchange or an outside stock exchange. This allows the DBA entity to be a full player in the electronic world of commerce, just as more stable and permanent players are.

Because the introduction certificate is based on the authorization certificates received by the convener, the authority of the DBA is traceable to the authorities of the actual parties to the business deal, even though no external authority is involved in the business deal aside from the passive convener. In short, the introduction certificate and conversation certificate together provide anonymity of membership in DBAs, yet with recourse to the message log.

The computers communicate with each other and also transmit execution instructions to outside parties (along with an introduction certificate if the execution instructions are issued by a party acting as or on behalf of a DBA entity) based on agreements reached during the business negotiations (step 98). The convener records, in a message log corresponding to the conversation certificate, the execution instructions transmitted to outside parties and, depending on the "business model" that the parties to the business deal are following, the messages transmitted between computers involved in the business deal, in the same manner described above in connection with FIGS. 3 and 4 (step 100). Each message sent to the convener for encryption and recording is decrypted by the party to whom the message is sent using the new public key. As conversation progresses, various parties may choose to super-encrypt their messages in whole or in part between all or only a subset of the participants, using a single private key. From the convener's point of view, this is immaterial even though the records it keep may be opaque to the convener due to the super-encryption, and all such conversation will be logged.

According to a "reflexive club" business model, the parties trust each other and do not require the convener to record the messages between the computers involved in the business deal. All of the execution instructions to outside parties are recorded, however. According to a "reflexive club with recourse" business model, the parties require the convener to record the messages between the computers as well as all of the execution instructions. Any of the parties to the business deal can have recourse to the message log because each of the parties can decrypt messages in the message log using the new public key contained in the conversation certificate. The parties to the business deal are, within the context of the business arrangement, highly motivate to prevent sharing the new public key with outside parties, however. An "external registration" business model is similar to the "reflexive club with recourse" model except that the parties to the business deal are free to share the new public-key with outside parties.

At the end of the conversation, one of the computers notifies the convener that the conversation is finished (step 102), and the convener records a "done" notice in the message log, encrypted with the new private key (step 104). After a predetermined period of time has elapsed, the convener destroys the private key (step 106). This makes it impossible to alter the log entry; yet the parties to whom the conversation certificate was distributed (and outside parties if an "external registration" business model is followed) may read the message log by decrypting the messages using the new public key contained in the conversation certificate (step 108). The DBA name or names can be anonymous, thereby obscuring the actual parties to the business deal, consistent with ordinary business practice. The core value of the message log is that it provides recourse to the record of the facts of the business deal, even though the DBA is anonymous and the exact nature of the business deal is electronically confidential.

Should recourse ever be required, the log could be opened by any party holding the public key of the original conversation certificate and then, if a portion of that log is found to be super-encrypted, the parties who hold the additional keys could be persuaded (perhaps by court order) to open their sub-conversations using those keys.

Occasionally it will be necessary to add or delete a party to a conversation that is already under way. Upon receiving an instruction from one of the computers involved in the business deal to add or delete a party, the convener will create a new conversation certificate and distribute it to the new set of parties The convener will record, as the final entry in a first message log, a link to a new message log and will record, as the first entry in the new message log, a link to the first message log, as described above in connection with FIGS. 3 and 4.

The parties to the business deal may communicate using smart cards in personal digital assistants (PDAs), which might be wireless. If wireless or other eavesdroppable technology is used, the smart cards would encrypt and decrypt message transmissions using the new public key in the conversation certificate and any super-encryption desired by the parties to the business deal. For example, execution instructions to specialists on the trading floor could be encrypted with a sender's private key and a recipient's public key to ensure security.

During the course of a conversation, and especially when a party to the conversation is added or deleted, the parties may request that the convener create an introduction certificate for a new DBA entity. The convener creates and distributes the introduction certificate in the manner described above, and only the parties to the business deal need to know the details of the new arrangement. The convener's reputation will serve to introduce the new DBA to external parties such as specialists on the trading floor of a stock exchange. Since the creation of the new DBA entity is the creation of a new party, the convener will create a new conversation certificate and distribute it to the parties in the manner described above.

The adoption of conversation certificates and introduction certificates as described above as a basic means of authorization by exchanges and other participants in the securities industry would enable the construction of new systems that would enable the construction of new systems that would "systematize" a much broader range of business functions than is now possible. A much broader range of agency relationships will be supportable than is now the case.

The ability for participants in such relationships to construct, at their own initiative and convenience, the system constructs that represent those relationships is particularly powerful. It allows such relationships to be made without any prior systems arrangements between the participants (the only prior arrangement required is a communications link between the participants, but that could be by way of any public network). The arrangements can be made before it is known what transactions will be performed by the relationship. For example, a partnership could be set up to make investments of certain characteristics; decisions about whether the transactions creating the investments should be made at one stock exchange or another, or on a commodities exchange, or on some combination of exchanges, can be deferred until later.

For example, a representative of an institutional money manager invites representative of three brokerages to meet him in negotiating a room at a stock exchange facility. The four enter the room and insert their smart-card certifying authorities into readers embedded in the desk in the room. Crypto-secure channels to each of the participants' home systems are automatically constructed when the smart cards were presented. The screens in the room light up to allow the participants to construct a conversation certificate to facilitate their work. The money manager describes a sensitive deal he needs to do: unwinding a large, complex position, and establishing a new one within certain parameters which are based, in part, on the effect the unwinding will have on the market. The participants 1) grant each other limited rights to share certain decision support systems and related information; 2) grant the team the right to "take" the securities being sold from the money manager's inventory; 3) grant the team the right to "receive" the payments for sold securities; 4) grant the team the right to use the "received" payments to purchase certain other securities; 5) grant the team the right to place received securities into the account of the money manager; 6) grant the team the right to make trades using the securities and received funds described above; 7) grant each broker member the right to initiate the trades described above on behalf of the team, in accordance with the rights granted to the team, provided at least one other team member (broker or money manager) gives consent either prior to or contemporaneously with the trade; 8) create an agent process to act on behalf of the team to accumulate results of the teams activities and notify the team members of the various running totals (the process gets a principal identity and is recorded as a member of the team); 9) set the expiration of the rights granted to be close of business, day after tomorrow, or at any earlier time the money manager may determine.

In addition, the money manager grants two of the broker members prior authority to initiate trades up to $1,000,000 in value. The third broker is given prior authority to initiate trades up to $2,000,000 in any security, or 250,000 shares of XYZ common.

A new conversation certificate is created to record the activities of the team. Cross references are entered into each of the certificates, and the certificate that created the team is sealed, and registered with the stock exchange in accordance with its rules.

Two of the team members leave the room and head to the trading floor, taking their smart-card certifying authorities with them. As they leave the room, they insert their smart-card certifying authorities into their PDAs or HHDs and, as they enter the regulated trading area, they log onto the floor and signal their readiness to trade.

While the broker-members on the floor are lining up trading opportunities for the various securities in the unwinding position, the other two team members are working the terminals in the negotiating room looking for opportunities (on and off the exchange) to establish the new position and to appropriately make the transition. They have access to some of the system resources of the team members who left the room, because those rights were granted them in the compact.

As the floor members make trades on behalf of the team their PDAs or HHDs relay the results back to the team's agent process, which records the activity in the open conversation certificate, and notifies all the team members of the amount of cash that has been accumulated by the team. The cash, of course, is really in the form of bookkeeping entries, probably in the trading accounts of the team members. The authority-relationship created by the team will allow the team to correctly allocate the results of the trading. In this scenario, all the results will eventually be returned to the money manager's accounts.

The money manager issues the credentials of the team to make a purchase of foreign currency contracts in Chicago, in anticipation of eventually taking a foreign equity position as part of the new position. Whether the money manager's identity needs to be revealed, or whether the team's identity is sufficient is at the discretion of the rules committee of the commodities exchange.

There have been described novel and improved apparatus and techniques for certifying authorizations in computer networks. It is evident that those skilled in the art may now make numerous uses and modifications of and departures from the specific embodiments described herein without departing from the inventive concept.

X.509 V3 Extensions

Jack Rieden

Open Market, Inc.

rieden@ openmarket.com x509ext.html

NOTE: The following is a digest of draft-iet-pkix-ipki-part1-01.txt and draft-ietf-pkix-ipki-part1-02.txt drafts.

1. Background X.509 Certificates

The X.509 v3 certificate Basic syntax follows. For signature calculation, the certificate is ASN.1DER encoded. ASN.1DER encoding is a tag, length, value encoding system for each element.

```
Certificate     : :=    SIGNED    {    SEQUENCE    {
    version             [0] Version DEFAULT v1,
    serialNumber            CertificateSerialNumber,
    signature               AlgorithmIdentifier,
    issuer                  Name,
    validity                Validity,
    subject                 Name,
    subjectPublicKeyInfo    SubjectPublicKeyInfo,
    issuerUniqueID  [1]  IMPLICIT UniqueIdentifier OPTIONAL,
                         -- If present, version must be v2 or v3
    subjectUniqueID [2]  IMPLICIT UniqueIdentifier OPTIONAL,
                         -- If present, version must be v2 or v3
    extensions      [3]  Extensions OPTIONAL
                         -- If present, version must be v3
    }    }
Version         : :=    INTEGER    {    v1(0), v2(1), v3(2)    }
CertificateSerialNumber    : :=    INTEGER
Validity        : :=    SEQUENCE    {
    notBefore               UTCTime,
    notAfter                UTCTime    }
UniqueIdentifier    : :=    BIT STRING
SubjectPublicKeyInfo    : :=    SEQUENCE    {
    algorithm               AlgorithmIdentifier,
    subjectPublicKey        BIT STRING    }
extensions      : :=    SEQUENCE OF Extension
Extension       : :=    SEQUENCE    {
    extnID          OBJECT IDENTIFIER,
    critical        BOOLEAN DEFAULT FALSE,
    extnValue       OCTET STRING }
```

The following items describe a use of the X.509 v3 certificate for the Internet.

Version: This field describes the version of the encoded certificate. When extensions are used, as expected in this profile, use X.509 version 3 (value is 2). If no extensions are present, but a UniqueIdentifier is present, use version 2 (value is 1). If only basic fields are present, use version 1 (the value is absent).

Implementations should be prepared to accept any version certificate. In particular, at a minimum, implementations should recognize version 3 certificates; determine whether any critical extensions are present; and accept certificates without critical extensions even if they don't recognize any extensions. A certificate with an unrecognized critical extension must always be rejected.

Serial Number: The serial number is an integer assigned by the CA to each certificate. It must be unique for each certificate issued by a CA (i.e., the issuer name and serial number identify a unique certificate).

Signature: This field contains the algorithm identifier for the algorithm used to sign the certificate.

Issuer Name: The issuer name (combined with the IssuerUniqueID, if present) provides a globally unique identifier of the authority signing the certificate.

Validity: This field indicates the dates on which the certificate becomes valid (notBefore) and on which the certificate ceases to be valid (notAfter). The UTCTime (Coordinated Universal Time) values included in this field shall be expressed in Greenwich Mean Time (Zulu) and include granularity to the minute, even though finer granularity can be expressed in the UTCTime format. That is, UTCTime should be expressed as YYMMDDHHMMZ.

Subject Name: The purpose of the subject name (combined with the SubjectUniqueID, if present) is to provide a unique identifier of the subject of the certificate.

Subject Public Key Info: This field is used to carry the public key and identify the algorithm with which the key is used.

Unique Identifiers: The subject and issuer unique identifier are present in the certificate to handle the possibility of reuse of subject and/or issuer names over time.

Certificate Extensions The extensions already defined by ANSI X9 and ISO for X.509 v3 certificates provide methods for associating additional attributes with users or public keys and for managing the certification hierarchy. The X.509 v3 certificate format also allows communities to define private extensions to carry information unique to those communities. Each extension in a certificate may be designated as critical or non-critical. A certificate using system (an application validating a certificate) must reject the certificate if it encounters a critical extension it does not recognize. A non-critical extension may be ignored if it is not recognized. The following presents recommended extensions used within Internet certificates and standard locations for information. Communities may elect to use additional extensions; however, caution should be exercised in adopting any critical extensions in certificates which might be used in a general context.

2.0 X.509 V3 Certificate Extensions 2.1 Standard Extensions 2.1.1 Key Attributes The keyAttributes extension contains information about the key itself including a unique key identifier, a key usage period (lifetime of the private key as opposed to the lifetime of the certificate), and an intended key usage. The Internet certificate should use the keyAttributes extension and contain a key identifier and private key validity to aid in system management. The key usage field in this extension is intended to be advisory (as contrasted with the key usage restriction extension which imposes mandatory restrictions). The key usage field in this extension should be used to differentiate certificates containing public keys for validating CA certificate signatures, for validating CA CRL signatures, and validating signatures on on-line transactions. However, the nonrepudiation and dataEncipherment values should not be used. Where a reference to a public key identifier is needed (as with an Authority Key ID) and is not included in an attribute in the associated certificate, an SHA-1 hash of the public key shall be used.

The GeneralizedTime values included in this field shall be expressed in Greenwich Mean Time (Zulu) and include granularity to the minute, even though finer granularity can be expressed in the GeneralizedTime format. That is, GeneralizedTime should be expressed as YYYYMMDDHHMMZ.

Implementors are warned that no DER is defined for GeneralizedTime, thus transformation between local time representations and the DER transfer syntax must be performed carefully when computing the hash value for a certificate signature. For example, a GeneralizedTime value which includes explict, zero values for seconds will not produce the same hash value as one in which the seconds are omitted. GeneralizedTime expresses the using four digits. Remember that UTCTime represents the value of a year modulo 100, with no indication of century.

```
KeyAttributes ::= SEQUENCE {
    keyIdentifier          KeyIdentifier OPTIONAL,
    intendedKeyUsage       KeyUsage OPTIONAL,
    privateKeyUsagePeriod  PrivateKeyValidity OPTIONAL }
KeyIdentifier ::= OCTET STRING
PrivateKeyValidity ::= SEQUENCE {
    notBefore              [0] GeneralizedTime OPTIONAL,
    notAfter               [1] GeneralizedTime OPTIONAL }
KeyUsage ::= BIT STRING {
    digitalSignature       (0),
    nonRepudiation         (1),
```
-continued
```
    keyEncipherment        (2),
    dataEncipherment       (3),
    keyAgreement           (4),
    keyCertSign            (5),
    offLineCRLSign         (6) }
```

2.1.2 Subject Alternative Name

The subject alternative names extension allows additional identities to be bound to the subject of the certificate. Defined options^ include an rfc822 name (electronic mail address), a DNS name, an IP address, and a URI. Other options exist, including completely local definitions. Multiple instances of a name and multiple name forms may be included. Whenever such identities are to be bound into a certificate, the subject alternative name (or issuer alternative name) extension shall be used. (Note: a form of such an identifier may also be present in the subject distinguished name; however, the alternative name extension is the preferred location for finding such information.) Further, if the only subject identity included in the certificate is an alternative name form (e.g., an electronic mail address), then the subject distinguished name should be empty (an empty sequence), the subjectAltName extension should be used, and the subjectAltName extension must be marked critical. Alternative names may be constrained in the same manner as subject^M distinguished names using the name constraints extension.

```
AltNames ::= SEQUENCE OF GeneralName
GeneralName ::= CHOICE {
    otherName       [0] INSTANCE OF OTHER-NAME,
    rfc822Name      [1] IA5String,
    dNSName         [2] IA5String,
    x400Address     [3] ORAddress,
    directoryName   [4] Name,
    ediPartyName    [5] IA5String,
    url             [6] IA5String,
    ipAddress       [7] OCTET STRING }
```

2.1.3 Issuer Alternative Name

As with 2.1.2, this extension is used to associate Internet style identities with the certificate issuer. If the only issuer identity included in the certificate is an alternative name form (e.g., an electronic mail address), then the issuer distinguished name should be empty (an empty sequence), the issuerAltName extension should be used, and the issuerAltName extension must be marked critical.

2.1.4 Basic Constraints

The basicConstraints extension identifies whether the subject of the certificate is a CA or an end user. In addition, this field can limit the authority of a subject CA in terms of the certificates it can issue. Discussion of certification path restriction is covered elsewhere in this draft. The subject type field should be present in all Internet certificates.

```
basicConstraints ::= SEQUENCE {
    subjectType       SubjectType,
    pathLenConstraint INTEGER OPTIONAL,
    permittedSubtrees [0] SEQUENCE OF GeneralName OPTIONAL,
    excludedSubtrees  [1] SEQUENCE OF GeneralName OPTIONAL }
```

```
-continued

SubjectType ::= BIT STRING {
    cA          (0),
    endEntity   (1) }
```

2.1.5 Name Constraints

The name constraints extension provides permitted and excluded subtrees that place restrictions on names that may be included within a certificate issued by a given CA. Restrictions may apply to the subject distinguished name or subject alternative names. Any name matching a restriction in the excluded subtrees field is invalid regardless of information appearing in the permitted subtrees. Restrictions for the rfc822, dNSName, and uri name forms are all expressed in terms of strings with wild card matching. An "*" is the wildcard character. The minimum and maximum fields in general subtree are not used for these name forms. For uris and rfc822 names, the restriction applies to the host part of the name. Examples would^ be foo.bar.com; www*.bar.com; *.xyz.com.

2.1.6 Policy Constraints

The certificatePolicies extension contains one or more object identifiers (OIDs). Each OID indicates the policy under which the certificate has been issued. This profile expects that a simple OID will be present in each PolicyElementInfo. The qualifier within the PolicyElementInfo should be absent. Implementations processing certificate policy fields are expected to have lists of those policies which they will accept. The implementations compare the policy identifier(s) in the certificate to that list. This field provides information to be used at the discretion of a relying party. In contrast, the policy identifier(s) in the keyUsageRestriction is a mandate by the issuer that a certificate be used only in particular environments.

```
CertificatePolicies  ::= SEQUENCE OF PolicyInformation
PolicyInformation    ::= SEQUENCE OF PolicyElementInfo
PolicyElementInfo    ::= SEQUENCE {
    policyElementId  OBJECT IDENTIFIER,
    qualifier        ANY DEFINED BY policyElementId OPTIONAL }
```

2.1.7 Authority Key Identifier

The authority key identifier extension provides a means of identifying the particular public key used to sign a certificate. The identification can be based on either the key identifier (from the key Attributes extension) or on the issuer name and serial number. The key identifier method is recommended in this profile. This extension would be used where an issuer has multiple signing keys (either due to multiple concurrent key pairs or due to changeover). In general, this extension should be included in certificates- If the issuer name/serial number approach is used, both the certIssuer and certSerialNumber fields must be present.

```
authorityKeyId ::= SEQUENCE {
    keyIdentifier    [0] KeyIdentifier OPTIONAL,
    certIssuer       [1] Name OPTIONAL,
    certSerialNumber [2] CertificateSerialNumber OPTIONAL }
```

2.1.8 Subject Directory Attributes

The DAM provides an extension for subject directory attributes. This extension may hold any information about the subject where that information has a defined X.500 Directory attribute. This extension is not recommended as an essential part of this profile but may be used in local environments. This extension is always non-critical.

subjectDirectoryAttributes : := SEQUENCE OF Attribute

2.1User Defined Extensions see RSA user defined extensions and extension handlers

3.0 CRL Extensions

The X.509 v2 CRL syntax is as follows. For signature calculation, the data that is to be signed is ASN.1 DER encoded. ASN.1 DER encoding is a tag, length, value encoding system for each element.

The extensions defined by ANSI X9 and ISO for X.509 v2 CRLs [X.509- AM] [X9.55] provide methods for associating additional attributes with CRLs. The X.509 v2 CRL format also allows communities to define private extensions to carry information unique to those communities. Each extension in a CRL may be designated as critical or non-critical. A CRL validation must fail if it encounters an critical extension which it does not know how to process. However, an unrecognized non-critical extension may be ignored. The following presents those extensions used within Internet CRLs. Communities may elect to use additional extensions; however, caution should be exercised in adopting any critical extensions in CRLs which might be used in a general context.

```
CertificateList    : :=   SEQUENCE    {
    tbsCertList              TBSCertList,
    signatureAlgorithm       AlgorithmIdentifier,
    signature                BIT STRING    }
TBSCertList        : :=   SEQUENCE    {
    version                  Version OPTIONAL,
                             -- if present, must be v2
    signature                AlgorithmIdentifier,
    issuer                   Name,
    thisUpdate               UTCTime,
    nextUpdate               UTCTime,
    revokedCertificates      SEQUENCE OF SEQUENCE    {
        userCertificate          CertificateSerialNumber,
        revocationDate           UTCTime,
        crlEntryExtensions       Extensions OPTIONAL    }   OPTIONAL,
    crlExtensions            [0] Extensions OPTIONAL    }
Version : :=    INTEGER     {   v1(0), v2(1), v3(2)    }
AlgorithmIdentifier   : :=   SEQUENCE    {
    algorithm                OBJECT IDENTIFIER,
```

-continued

```
   parameters              ANY DEFINED BY algorithm OPTIONAL    }
                           -- contains a value of the type
                           -- registered for use with the
                           -- algorithm object identifier value
CertificateSerialNumber ::=  INTEGER
Extensions ::=     SEQUENCE OF Extension
Extension ::=      SEQUENCE    {
   extnId                  OBJECT IDENTIFIER,
   critical                BOOLEAN DEFAULT FALSE,
   extnValue               OCTET STRING    }
                           -- contains a DER encoding of a value^M
                           -- of the type registered for use with^M
                           -- the extnId object identifier value
```

3.1 Standard Extensions

3.1.1 Reason Code

The reasonCode is a non-critical CRL entry extension that identifies the reason for the certificate revocation. CAs are strongly encouraged to include reason codes in CRL entries; however, some reasonCode values are strictly prohibited. The reason code extension permits certificates to placed on hold or suspended. The processing associated with suspended certificates greatly complicates certificate validation, therefore the use of reasonCode values certificateHold (6), certHoldRelease (7), and removeFromCRL (8) shall not be used. Also, the reasonCode CRL entry extension should be absent instead of using the unspecified (0) reasonCode value.

```
           CRLReason ::= ENUMERATED {
              unspecified           (0),
              keyCompromise         (1),
              caCompromise          (2),
              affiliationChanged    (3),
              superseded            (4),
              cessationOfOperation  (5),
              certificateHold       (6),
              certHoldRelease       (7),
              removeFromCRL         (8) }
```

3.1.2 Invalidity Date

The invalidityDate is a non-critical CRL entry extension that provides the date on which it is known or suspected that the private key was compromised or that the certificate otherwise became invalid. This date may be earlier than the revocation date in the CRL entry, but it must be later than the issue date of the previously issued CRL. Remember that the revocation date in the CRL entry specifies the date that the CA revoked the certificate. Whenever this information is available, CAs are strongly encouraged to share it with CRL users.

InvalidityDate ::= GeneralizedTime^M

3.1.3 Authority Key Identifier

The authorityKeyIdentifier is a non-critical CRL extension that identifies the CA's key used to sign the CRL. This extension is useful when a CA uses more than one key; it allows distinct keys differentiated (e.g., as key updating occurs). The key may be identified by an explicit key identifier, by identification of a certificate for the key (giving certificate issuer and certificate serial number), or both. If both are used then the CA issuer shall ensure that all three fields are consistent.

```
AuthorityKeyId ::= SEQUENCE {
   keyIdentifier       [0] KeyIdentifier OPTIONAL,
   certIssuer          [1] Name OPTIONAL,
   certSerialNumber    [2] CertificateSerialNumber OPTIONAL }
   -- certIssuer and certSerialNumber constitute a logical pair,
   -- and if either is present both must be present. Either this
   -- pair or the keyIdentifier field or all shall be present
```

3.1.4 CRL Number

The cRLNumber is a non-critical CRL extension which conveys a monotonically increacing sequence number for each CRL issued by a given CA through a specific CA X.500 Directory entry or CRL distribution point. This extension allows users to easily determine when a particular CRL superceeds another CRL- CAs conforming to this profile shall include this CRL.

CRLNumber ::= INTEGER

3.1.5 Issuing Distribution Point

The issuingDistributionPoint is a critical CRL extension that identifiers the CRL distribution point for this particular CRL, and it indicates whether the CRL covers revocation for end entity certificates only, CA certificates only, or a liritied set of reason codes. Support for CRL distribution points is strongly encouraged. The use of certificateHold is strictly prohibited in this profile.

Only the following reason codes may be used in conjunction with this profile. The use of keyCompromise (1) shall be used to indicate compromise or suspected compromise. The use of affiliationChanged (3), superseded (4), or cessationOfOperation (5)shall be used to indicate routine compromise.

The CRL is signed by the CA's key. CRL Distribution Points do not have their own key pairs. If the CRL is stored in the X.500 Directory, it is stored entry corresponding to the CRL distribution point, which may be different that the directory entry of the CA.

CRL distribution points, if used, should be partitioned the CRL on the basis of compromise and routine revocation. That is, the revocations with reason code (1) shall appear in one distribution point, and the revocations with reason codes (3), (4). and (5) shall appear in another distribution point.

```
DistributionPoint ::= SEQUENCE {
   distributionPoint   DistributionPointName,
   reasons             ReasonFlags OPTIONAL }
DistributionPointName ::= CHOICE {
   fullName            [0] Name,
   nameRelativeToCA    [1] RelativeDistinguishedName,
   generalName         [2] GeneralName }
```

```
GeneralName ::= CHOICE {
    otherName            [0] INSTANCE OF OTHER-NAME,
    rfc822Name           [1] IA5String,
    dNSName              [2] IA5String,
    x400Address          [3] ORAddress,
    directoryName        [4] Name,
    ediPartyName         [5] IA5String,
    uniformResourceLocator [6] IA5String }
OTHER-NAME ::= TYPE-IDENTIFIER
```

3.1.6 Delta CRL Indicator

The deltaCRLIndicator is a critical CRL extension that identifies a delta-CRL. The use of delta-CRLs can significantly improve processing time for applications which store revocation information in a format other than the CRLstructure. This allows changes to be added to the local database while ignoring unchanged information that is already in the local databse. CAs are shall always issue a complete CRL when a delta-CRL is issued.

The value of BaseCRLNumber identifies the CRL number of the base CRL that was used as the starting point in the generation of this delta- CRL. The delta-CRL contains the changes between the base CRL and the current CRL issued along with the delta-CRL. It is the decision of a CA as to whether to provide delta-CRLs. Again, a delta-CRL shall not be issued without a corresponding CRL. The value of CRLNumber for both the delta-CRL and the corresponding CRL shall be identical.

A CRL user constructing a locally held CRL from delta-CRLs shall consider the constructed CRL incomplete and unusable if the CRLNumber of the received delta-CRL is more that one greater that the CRLnumber of the delta-CRL last processed.

3.2 User Defined Extensions

TBD

References
  pkix-part1.draft
  pkix-part2.draft

What is claimed is:

1. A system for creating a log of a conversation, comprising:
   an arbiter computer; and
   a plurality of conversation computers;
   the arbiter computer and the conversation computers being interconnected by a computer network;
   the arbiter computer being programmed to create a public key pair comprising a new public key and a new private key, to cause the new public key to be transmitted to the conversation computers, to use the new private key to encrypt messages transmitted by at least some of the conversation computers during a conversation among the conversation computers, and to store the encrypted messages in a message log;
   the conversation computers being programmed to receive the public key, to transmit messages during the conversation, and to cause messages in the message log to be decrypted using the new public key.

2. The system of claim 1 wherein the arbiter computer is programmed to decrypt the public key certificate that identify the user of the conversation computer, using a public key of a certifying authority that generated the certificate identifying the user of the conversation computer.

3. The system of claim 1 wherein the arbiter computer is programmed to create a conversation certificate that certifies that a holder of the conversation certificate is authorized to read messages in a message log referred to in the conversation certificate, the conversation certificate comprising the new public key.

4. The system of claim 3 wherein the arbiter computer is programmed to encrypt the conversation certificate using the public key of a user of one of the conversation computers.

5. The system of claim 1 wherein the messages transmitted by the conversation computers comprise messages transmitted to parties other than the conversation computers.

6. The system of claim 1 wherein the messages transmitted by the conversation computers comprise messages transmitted between conversation computers.

7. The system of claim 1 wherein at least one of the conversation computers is programmed to notify the arbiter computer that a conversation among the conversation computers is completed.

8. The system of claim 7 wherein the arbiter computer is programmed to place a notice in the message log indicating that the conversation is finished.

9. The system of claim 1 wherein the arbiter computer is programmed to destroy the private key after the conversation is completed.

10. The system of claim 1 wherein at least one of the conversation computers is programmed to notify the arbiter computer of a change in parties to the conversation.

11. The system of claim 1 wherein, in response to notification of the change in parties, the arbiter computer is programmed to create another public key pair comprising a new public key and a new private key, to cause the new public key to be transmitted to the conversation computers, to use the new private key to encrypt messages transmitted by at least some of the conversation computers during a conversation among the conversation computers, and to store the encrypted messages in another message log.

12. A method for creating a log of a conversation in a computer network comprising an arbiter computer and a plurality of conversation computers, comprising the steps of:
   creating, at the arbiter computer, a public key pair comprising a new public key and a new private key;
   causing the new public key to be transmitted to the conversation computers;
   transmitting messages during a conversation among the conversation computers;
   using the new private key at the arbiter computer to encrypt messages transmitted by at least some of the conversation computers during the conversation
   storing the encrypted messages in a message log;
   causing messages in the message log to be decrypted using the new public key transmitted to at least one of the conversation computers.

13. A system for creating a log of a conversation, comprising:
   an arbiter computer; and
   a plurality of conversation computers, programmed to transmit to the arbiter computer a public key certificate that identifies a user of the conversation computer and a public key of the user;
   the arbiter computer and the conversation computers being interconnected by a computer network;
   the arbiter computer being programmed to create a public key pair comprising a new public key and a new private key, to cause the new public key to be transmitted to the conversation computers, to use the new private key to encrypt messages transmitted by at least some of the conversation computers during a conversation among the conversation computers, and to store the encrypted messages in a message log;

the conversation computers being programmed to receive the public key, to transmit messages during the conversation and to cause messages in the message log to be decrypted using the new public key.

* * * * *